United States Patent [19]

Bücker

[11] Patent Number: 4,580,527

[45] Date of Patent: Apr. 8, 1986

[54] DEVICE FOR AUTOMATICALLY RINSING MILKING PAILS

[75] Inventor: Heinrich Bücker, Langenberg, Fed. Rep. of Germany

[73] Assignee: Westfalia Separator AG, Oelde, Fed. Rep. of Germany

[21] Appl. No.: 617,412

[22] Filed: Jun. 5, 1984

[30] Foreign Application Priority Data

Jun. 21, 1983 [DE] Fed. Rep. of Germany ....... 3322226

[51] Int. Cl.[4] ............................................... A01J 7/00
[52] U.S. Cl. .................. 119/14.18; 134/56 R
[58] Field of Search .............. 119/14.18, 14.01, 14.08, 119/158, 159

[56] References Cited

U.S. PATENT DOCUMENTS

| | | | |
|---|---|---|---|
| 2,213,069 | 8/1940 | Engels et al. ............. | 119/14.18 |
| 2,595,539 | 5/1952 | Redman, Jr. ............. | 119/14.18 |
| 2,703,068 | 3/1955 | Hodsdon ................. | 119/14.18 |
| 3,099,277 | 7/1963 | Mäehans .................. | 119/14.18 |
| 3,228,374 | 1/1966 | Sampson et al. .......... | 119/14.18 |
| 4,476,808 | 10/1984 | Meermoller et al. ...... | 119/14.18 |

Primary Examiner—Gene Mancene
Assistant Examiner—James Hakomaki
Attorney, Agent, or Firm—Sprung Horn Kramer & Woods

[57] ABSTRACT

A device for rinsing milk pails automatically allows the use of a known rinser that rinse is suctioned into subject to partial vacuum and leaves again subject to atmospheric pressure. Prior to cleaning, a check valve is mounted over the milk-inlet connection and a cap over the air-suction connection to the upside-down milk-pail lid and the milk pail positioned on it with an annular spacer in between. The milk-inlet connection and the air-suction connection are connected to the rinser with hoses. During the initial suctioning stage, rinse is suctioned out of a rinsing tub through the teat cups, which are also connected up, and the pail simultaneously evacuated. When air is allowed into the rinser, part of the rinse flows back into the rinsing tube through the teat cups and the rest is sprayed into the milk pail, which is subject to partial vacuum, through the milk-inlet connection, the check valve, and a spray nozzle. During the next suctioning stage the rinse in the pail is suctioned out again through two channels and the pail is again evacuated. This process is repeated constantly during rinsing.

11 Claims, 1 Drawing Figure

U.S. Patent  Apr. 8, 1986  4,580,527
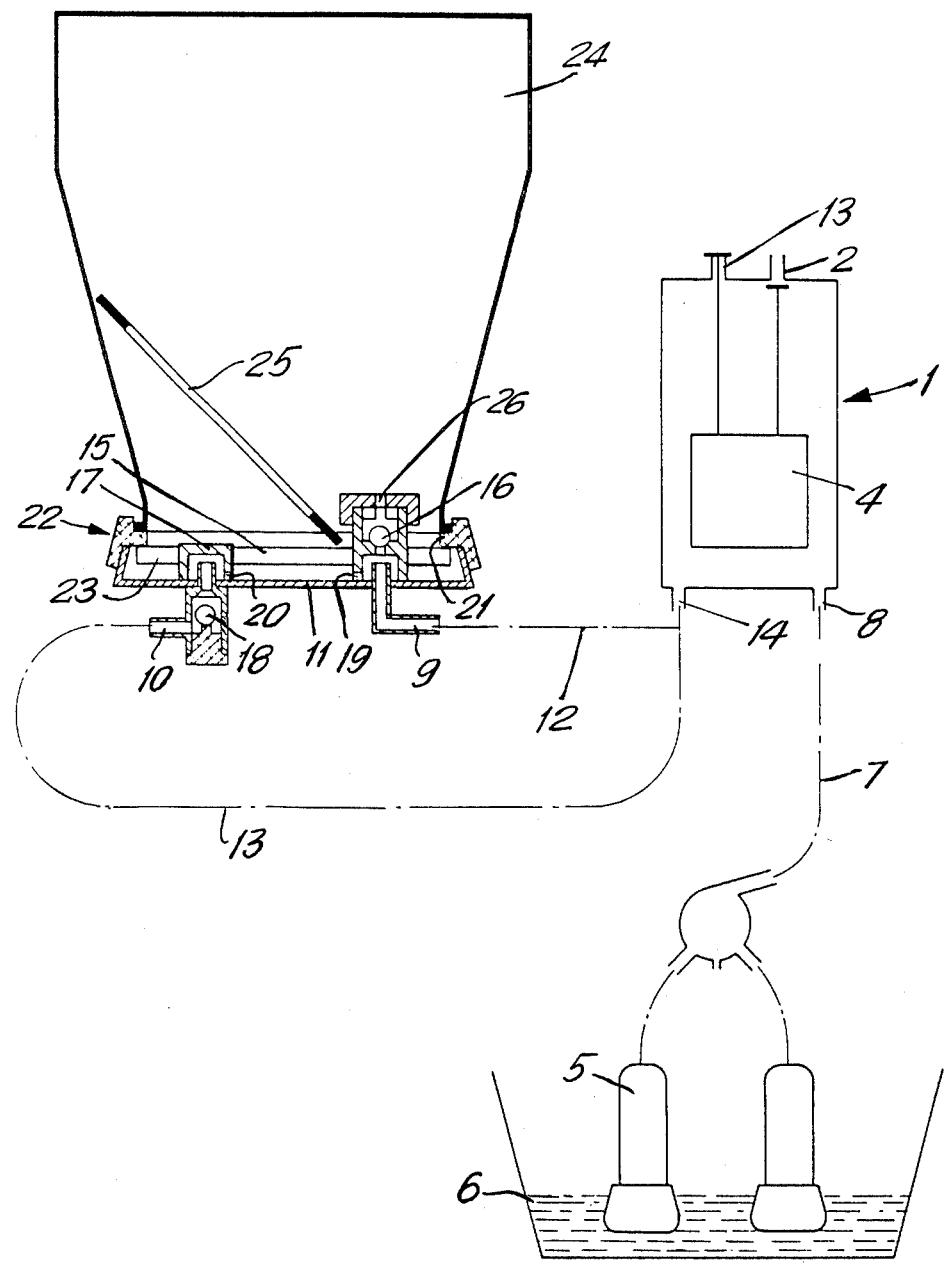

DEVICE FOR AUTOMATICALLY RINSING MILKING PAILS

BACKGROUND OF THE INVENTION

The present invention relates to a device for automatically rinsing milking pails by means of a rinser, that rinse is suctioned into subject to partial vacuum and that rinse leaves again subject to atmospheric pressure, wherein the milking pail has a lid provided with a milk-inlet connection and an air-suction connection that has a check valve.

Milking pails have not up to now been capable of being rinsed with rinsers of this type because the rinsing action has not been sufficient. They have accordingly always been rinsed manually, with the teat cup being rinsed automatically by the rinser. The test cups are immersed in a tub full of rinse for this purpose and connected to the rinser by their milk hoses. The rinse is suctioned into the rinser through the teat cups subject to partial vacuum and let out again by admitting air into the rinser. The shift from partial vacuum to atmospheric pressure is obtained with a float.

SUMMARY OF THE INVENTION

The object of the present invention is to provide a device for milk pails that allows the milk pail to be thoroughly rinsed along with its lid and sealing ring simultaneously with the teat cup by means of a known type of rinser.

This object is attained in accordance with the invention in that the device is provided with a check valve and spray nozzle, with the check valve designed in such a way that it can be mounted over the milk-inlet connection which projects out of the inside surface of the milk-pail lid with the spray nozzle facing upwardly.

The pail to be rinsed is suspended with its lid down, the check valve with the spray nozzle mounted over the milk-inlet connection, and the milk-inlet connection and air-suction connection connected to the rinser with hoses in the same way as the teat cups. During the initial suctioning stage, rinse is suctioned into the rinser through the teat cups, with the pail simultaneously being subjected to partial vacuum through the milk-inlet connections and the air-suction connections. When air is admitted into the rinser, part of the rinse flows back into the rinsing tub through the teat cups, the rest being sprayed into the pail through the milk-inlet connection, the check valve, and the spray nozzle to rinse the pail.

The device is preferably designed such that the side of the check valve facing the lid of the milk pail is provided with channels. The residual liquid can also be suctioned up from the lid through these channels during the rinser suctioning process.

The device can in a practical way be equipped with a cap that covers the air-suction connection projecting from the inside surface of the milk-pail lid, with the side of the cap facing the lid being provided with channels through which the residual liquid in this area can also be suctioned off.

In another embodiment of the invention, the device has an annular spacer between the milk pail and its lid to facilitate cleaning the lid. Access for the rinse is hereby provided in particular to the inner edge of the lid, where a sealing ring is situated in normal operation.

To simplify attaching the check valve and cap to the lid of the milk pail, the annular spacer is provided with an edge that projects inward and rests on appropriate mounts on the check valve and cap and holds them in position.

A preferred embodiment of the invention will now be described with reference to the attached drawing, wherein

BRIEF DESCRIPTION OF THE DRAWINGS

The FIGURE is a schematic of the device according to the invention with a partial sectional view.

DETAILED DESCRIPTION OF THE INVENTION

A rinser 1 communicates with a source of partial vacuum and through a connection 2 and with the atmosphere through a channel 3. The pressure ratios in rinser 1 are controlled by a float 4. The teat cups 5 to be cleaned are immersed in a rinsing tub 6 full of rinse and connected to rinser 1 through milk hoses 7 and hose connections 8. The milk-inlet connection 9 and air-suction connection 10 of an upside down milk-pail lid 11 communicate with a rinser hose connection 14 through hoses 12 and 13. A device 15 is mounted on the inside surface of milk-pail lid 11 with a check valve 16 over milk-inlet connection 9 and with a cap 17 over air-suction connection 10, which is provided with a check valve 18. Check valve 16 and cap 17 are provided with channels 19 and 20. Device 15 is attached to milk-pail lid 11 by the edge 21 of an annular spacer 22 that rests on appropriate mounts 23 on the device. Annular spacer 22 is located between milk pail 24, in which a sealing ring 25 is loosely inserted, and its lid 11. Check valve 16 has a spray nozzle 26.

During the initial rinser-suctioning stage, only rinse is at first suctioned out of rinsing tub 6 into the rinser through teat cup 5, whereas milk pail 24 is evacuated through channels 19 and 20, milk-inlet connection 9, air-suction connection 10, hoses 12 and 13, and hose connection 14. As soon as float 4 closes off connection 2 and opens channel 3, rinser 1 empties again through teat cups 5 subject to atmospheric pressure. Since milk pail 24 is subject to partial vacuum, rinse will simultaneously be suctioned into it through check valve 16 and spray nozzle 26, cleaning the pail. The check valve 18 in air-suction connection 10 is closed during this procedure. Rinse accumulates on milk-pail lid 11 and is suctioned off during the next rinser suctioning stage through channels 19 and 20. The spraying and suctioning of milk pail 24 accordingly alternate continuously during the whole cleaning stage and lead to thorough cleaning of the pail.

It will be appreciated that the instant specification and claims are set forth by way of illustration and not limitation, and that various modifications and changes may be made without departing from the spirit and scope of the present invention.

What is claimed is:

1. A device for automatically rinsing a milking pail, for use with a rinser that rinse is suctioned into subject to partial vacuum and that leaves again subject to atmospheric pressure and a milking pail having a lid provided with a milk-inlet connection having a portion projecting out of the inside surface of the pail lid and an air-suction connection that has a check valve, the device comprising: a rinsing check valve and spray nozzle associated with the rinsing check valve and means for mounting the check valve over the portion of the milk-inlet connection that projects out of the inside surface of the milk-pail lid.

2. The device as in claim 1, further comprising channels inside of the rinsing check valve facing the lid of the milk pail.

3. The device as in claim 1, further comprising a cap for covering the air-suction at the inside surface of the milk-pail lid when the rinsing check valve is mounted in place, with the side of the cap facing the lid being provided with channels.

4. The device as in claim 1, wherein the mounting means includes an annular spacer disposable between the milk pail and the lid.

5. The device as in claim 4, wherein the annular spacer has an edge that projects inward and wherein the mounting means further comprises a plate which rests on the edge and holds the rinsing check valve and cap in position.

6. In a milking system having teat cups and a rinser connected to the teat cups for suctioning rinse into and emptying rinse out of the teat cups immersed in a tub of rinse by alternately subjecting the teat cups to a partial vacuum and atmospheric pressure, the improvement comprising: a milk pail having a cover with a milk inlet and an air suction connection therein and means for connecting the inlet and suction connection to the rinser with the milk pail in the inverted state, to effect the rinsing thereof during the rinsing of the teat cups, wherein the milk-inlet has a portion projecting out of the inside surface of the pail cover and the air-suction connection has a check valve and wherein the connecting means comprises a device disposed on the inside surface of the cover and including a rinsing check valve and spray nozzle associated with the rinsing check valve and means for mounting the check valve over the portion of the milk-inlet that projects out of the inside surface of the milk pail cover.

7. The system as in claim 6, wherein the device channels inside of the rinsing check valve facing the cover of the milk pail.

8. The system as in claim 7, wherein the device further comprises a cap for covering the air-suction connection at the inside surface of the milk pail cover when the rinsing check valve is mounted in place, with the side of the cap facing the cover being provided with channels.

9. The system as in claim 8, wherein the mounting means includes an annular spacer disposable between the milk pail and the cover.

10. The system as in claim 9, wherein the annular spacer has an edge that projects inward and wherein the mounting means further comprises a plate which rests on the edge and holds the rinsing check valve and cap in position.

11. In a method of rinsing in a milking system wherein teat cups are immersed in a tub of rinse, a rinser is connected to the teat cups for suctioning rinse into the teat cups by subjecting the teat cups to a partial vacuum and emptying the rinse through the teat cups by subjecting the teat cups to atmospheric pressure, the improvement comprising rinsing a milk pail during the rinsing of the teat cups by inverting the milk pail to dispose the cover at the bottom thereof, connecting the milk inlet and air suction connections in the milk pail cover to the rinser, evacuating the contents of the milk pail during the suctioning of rinse through the teat cups by the partial vacuum and establishing a partial vacuum in the milk pail and providing a spray nozzle at the milk inlet inside the pail, whereby during the emptying step rinse is simultaneously suctioned into the milk pail through the spray nozzle as a result of the partial vacuum in the milk pail.

* * * * *